Figure 1:
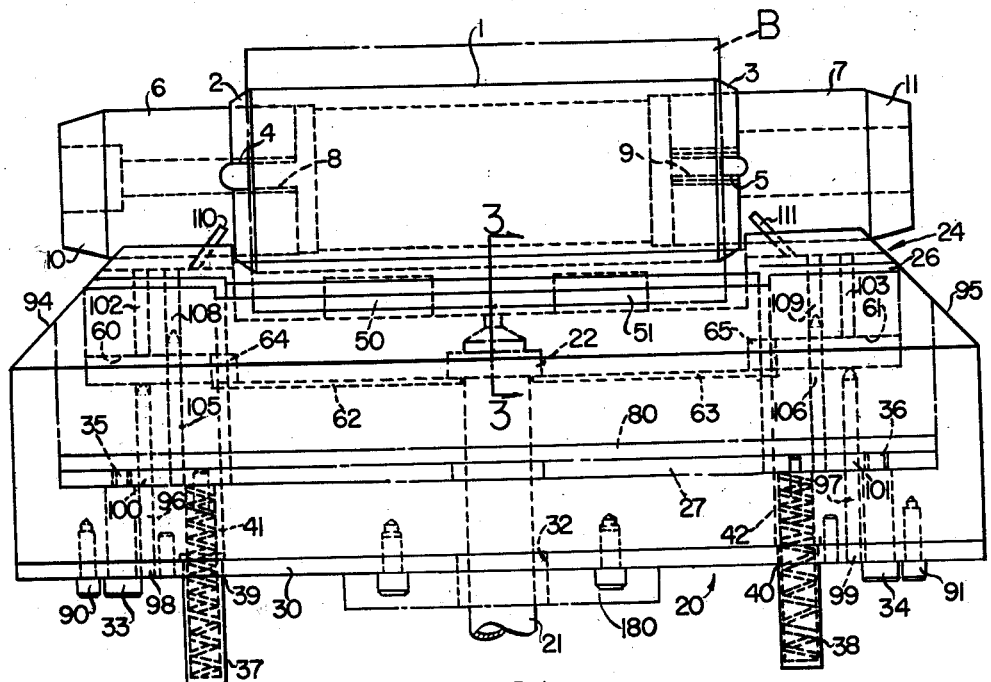

Aug. 27, 1963         J. R. TURK         3,101,910
WIRE GUIDING HEADS FOR COIL WINDING MACHINES
Filed June 7, 1961                       3 Sheets-Sheet 1

INVENTOR.
JAMES R. TURK
BY
Oberlin, Maky & Donnelly
ATTORNEYS

Aug. 27, 1963    J. R. TURK    3,101,910
WIRE GUIDING HEADS FOR COIL WINDING MACHINES
Filed June 7, 1961    3 Sheets-Sheet 2

INVENTOR.
JAMES R. TURK
BY
Oberlin, Maky & Donnelly
ATTORNEYS

Aug. 27, 1963   J. R. TURK   3,101,910
WIRE GUIDING HEADS FOR COIL WINDING MACHINES
Filed June 7, 1961   3 Sheets-Sheet 3

*INVENTOR.*
JAMES R. TURK
BY
Oberlin, Maky & Donnelly
ATTORNEYS

United States Patent Office 3,101,910
Patented Aug. 27, 1963

3,101,910
WIRE GUIDING HEADS FOR COIL WINDING MACHINES
James R. Turk, Euclid, Ohio, assignor to Vincent K. Smith, Gates Mills, Ohio
Filed June 7, 1961, Ser. No. 115,482
14 Claims. (Cl. 242—13)

This invention relates generally, as indicated, to wire guiding heads for coil winding machines and more particularly to guiding heads for winding coils for dynamoelectric machines, transformers, inductors, electromagnets, etc.

The guiding heads of the present invention more particularly comprise improvements in the winding head disclosed in my copending application entitled "Coil Winding Apparatus," Serial No. 61,557, filed October 10, 1960 now Patent No. 3,076,613. In such application, there is illustrated automatic coil winding apparatus in which a lightweight winding element or flyer arm revolves about a stationary slotted body into the slots of which the wire is wound. The apparatus incorporates a fast start and stop mechanism which will wind concentrically coils into different pairs of slots in the body with such start and stop apparatus being controlled by counters so that the desired number of turns can quickly be formed in the proper pairs of slots in the slotter body.

As is well-known in the art, "concentric windings" are wound in the slots of the stator body formed by a group of laminations and the concentric windings form the pole group which then comprises a plurality of coils of different diameters formed in different pairs of slots so that each coil has a different throw and that the centers of all the coils in a given pole group will coincide.

In, for example, a split phase induction motor, there are two separate and distinct windings on the stator, viz., a main or running winding; and an auxiliary or starting winding. Each winding may consist of two opposed pole groups or as many pole groups as there are poles. The pole groups of the main windings are generally spaced 90° from the pole groups of the start windings. A starting switch in series with the auxiliary or start winding will open at approximately 75 to 80% of the synchronous speed and this switch is usually operated by a centrifugal device. Thus the start windings will be disconnected once the motor comes up to speed. Generally, the start windings employ a small size of copper wire or wire of a material having a specific resistance higher than copper so that the start winding is lightweight and requires less slot space than the main windings which are usually of heavier wire. Moreover, the main windings usually consist of more turns than the auxiliary or start winding and the main winding is generally wound first and the auxiliary or start winding can be placed on top of the main winding in some of the same slots.

Heretofore, concentric coils have been wound on stepped blocks or molds provided with as many steps as there are parts to the coil. If the steps are tapered, considerable advantage is obtained in that each individual turn will have a different perimeter or diameter and accordingly the turns will not interfere with one another when the coil is being inserted in the slots. Moreover, loops at the ends of the slots will permit the ends of the coil properly to be molded and formed in the finished motor.

With the present invention, locating pins are automatically positioned properly to form the ends of the coil as the coils are wound in successive pairs of slots. It is then possible to wind the start windings first in, for example, three pairs of slots for each pole on one machine and then by simply changing the wire guiding head, or by using a second machine with such guiding head already thereon, to wind the main windings in an identical manner. Automatically positioned locating pins determine the proper spacing of the head from the slotted body and also hold the end loops of the coils from the ends of the slotted body.

It is accordingly a principal object of the present invention to provide wire guiding heads for coil winding machines which will enable the main and start windings quickly and easily to be placed in the stator body.

It is another main object to provide a wire guiding head which can be employed with the machine disclosed in my aforementioned copending application automatically to position coils of the proper diameter in the proper slots of the stator.

It is a further main object to provide a wire guiding head which will automatically locate and space the guide portions thereof with respect to the proper slots in the stator.

It is another object to provide pins for the end loops of the coils which will be positioned automatically as the guides for the coils are brought into position with respect to the selected pair of slots.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
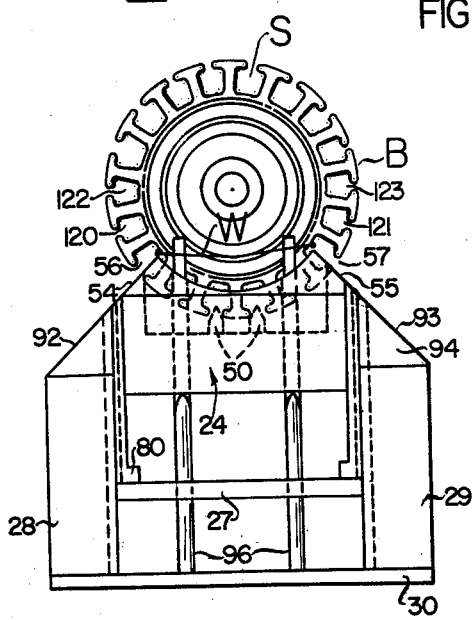
Figure 3:
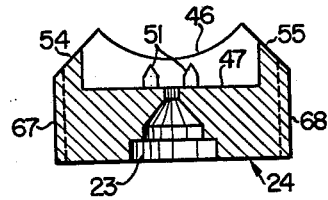
Figure 4:
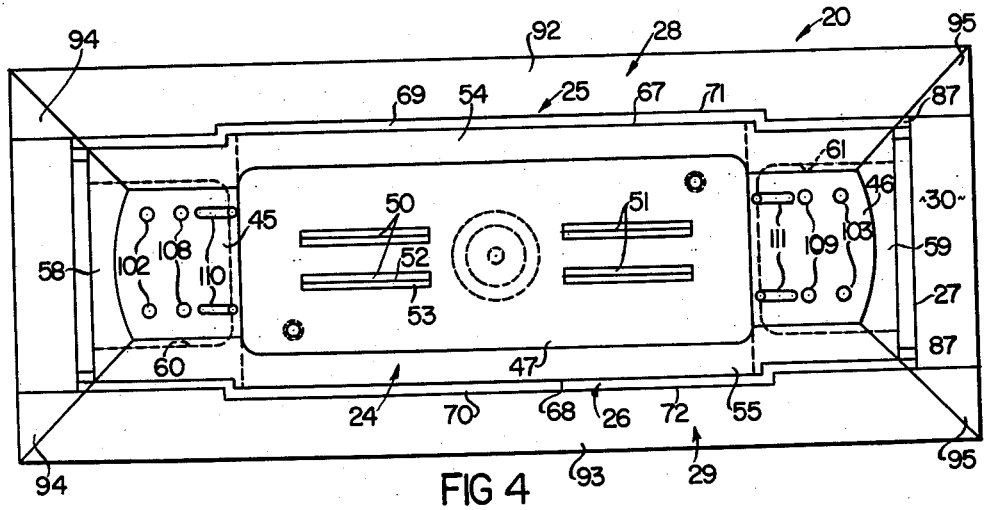
Figure 5:
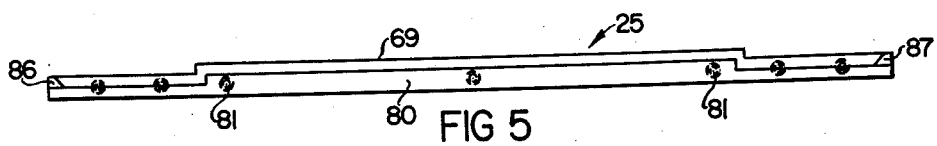
Figure 6:
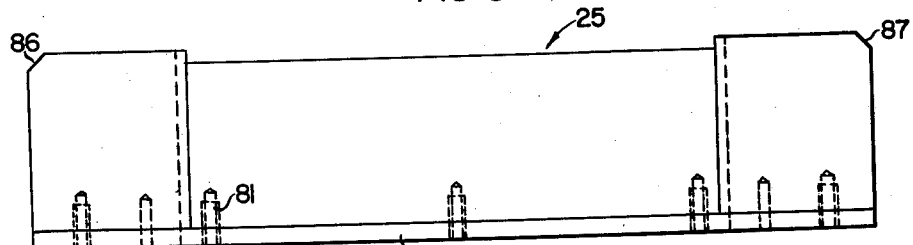
Figure 8:
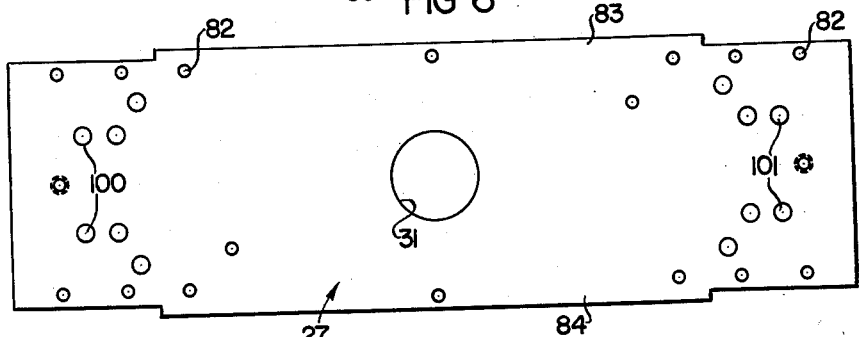
Figure 7:
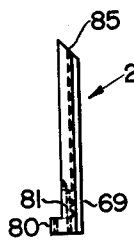
Figure 9:
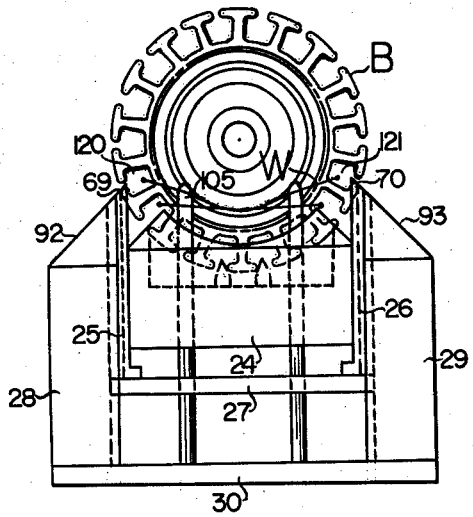
Figure 10:
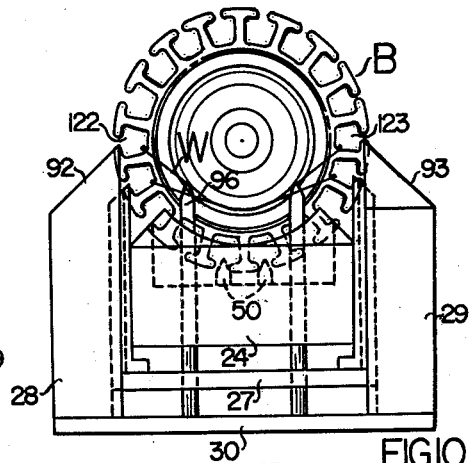
Figure 12:
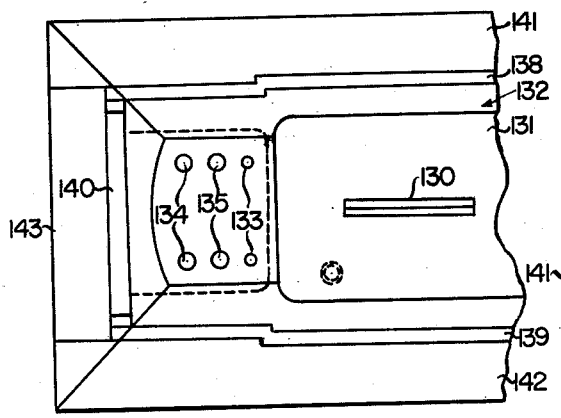
Figure 13:
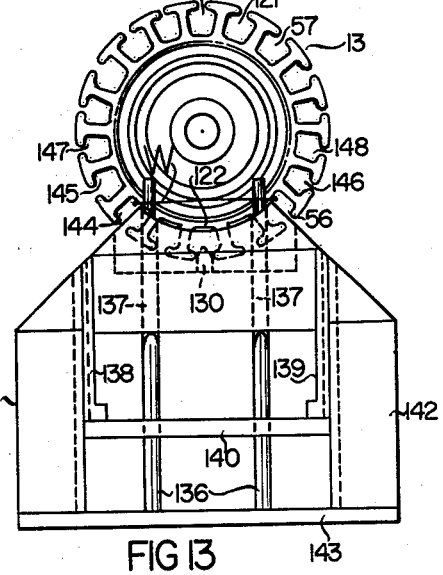
Figure 11:
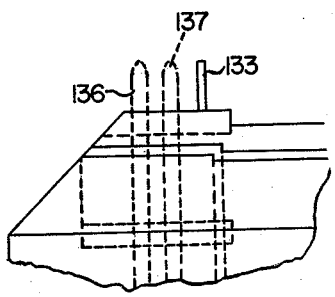

In said annexed drawings:
FIG. 1 is a side elevation of a wire guiding head in accordance with the present invention;
FIG. 2 is an end elevation of the wire guiding head of FIG. 1;
FIG. 3 is a transverse section of the locating head taken substantially on the line 3—3 of FIG. 1;
FIG. 4 is a plan view of the wire guiding head of FIG. 1 with the workpiece removed;
FIG. 5 is a top plan view of one of the guide plates shown in FIG. 4;
FIG. 6 is a side elevation of such guide plate;
FIG. 7 is an end elevation of such guide plate;
FIG. 8 is a plan view of the base plate for such guide plates as employed with the present invention;
FIG. 9 is an end elevation of the wire guiding head showing it in its intermediate position;
FIG. 10 is a view similar to FIG. 9 showing the head in its "full-in" position;
FIG. 11 is a fragmentary view of another form of head in accordance with the present invention;
FIG. 12 is a fragmentary plan view of the head of FIG. 11; and
FIG. 13 is an end elevation of the head of FIGS. 11 and 12 in its initial work receiving position.

With reference now more particularly to FIGS. 1 and 2, it will be seen that the slotted body B, into pairs of slots S of which coils of wire are to be wound by the present invention, may comprise a stator body which forms a part of the stator construction in an electric motor. Such body B comprises a stack of sheet metal stampings or laminations which may be placed on a stacking tube 1, such tube having beveled ends 2 and 3 and transverse slots or keyways 4 and 5, there being four such equally quadrant spaced slots in each end of the stacking tube 1. Clamping heads 6 and 7 may fit within the hollow interior of the stacking tube. Each of the clamping heads 6 and 7 is provided with external longitudinally extending slots 8 and 9 which correspond to the transverse slots 4 and 5 in the stacking tube 1. Clamping bars may then be employed within such slots properly to clamp the ends of the slotted body B to hold the same properly in place upon the stacking tube 1. The clamping heads 6 and 7 are provided with frusto-conical outer surfaces 10 and 11, which serve as wire guides in all indexed positions of the workpiece B automatically forming the wires around the center or open hole therethrough.

The slotted body B may be indexed through various positions by a drive connected to the head 7 to present selected pairs of slots to the winding head 20. Reference may be had to my copending application, Serial No. 61,557 entitled "Coil Winding Apparatus" for a more clear disclosure of a slotted body mounted on such clamping and indexing heads.

Referring now additionally to FIGS. 3 through 7, it will be seen that the wire guiding head 20 of the present invention shown in FIG. 1 is adapted to be mounted on the distal end of a drive shaft 21, which shaft 21 carries an adjustable flyer or winding arm which rotates rapidly to wind the wire in the selected pair of slots in the slotted body B. The outer end of the shaft 21 is journalled in a bearing 22 fitted within a socket 23 for such bearing in locating head 24. The shaft 21 is thus journalled in the locating head 24 and the head 24 is fixed with respect to the outer end of the shaft.

Referring especially to FIG. 4, in addition to the locating head 24, the wire guiding head 20 includes two guide plates 25 and 26 mounted on base plate 27 and two side guides 28 and 29 mounted on base plate 30. Unlike the locating head 24, the plates 27 and 30 are provided with central apertures as shown at 31 and 32 respectively so that movement of the base plates and thus the guides mounted thereon is permitted axially of the drive shaft 21. The guide plates 25 and 26 mounted on base 27 are then mounted for movement as a unit with respect to the locating head 24 along the drive shaft 21. Also, the base 30 with the side guides 28 and 29 mounted thereon is movable axially of the drive shaft 21 and with respect to the locating head 24 as well as the unit formed by plates 25, 26 and base 27.

Thus not only are the guides 25 and 26 as well as the side plates 28 and 29 movable with respect to the locating head 24, but they are also movable with respect to each other. The bases 27 and 30 and the guide plates mounted thereon are interconnected by pairs of shoulder bolts 33 and 34 (see FIG. 1) threaded in the plate 27 as shown at 35 and 36 with the heads of such bolts providing shoulder stops for the plate 30. Pairs of plunger caps 37 and 38 may be received within pairs of apertures 39 and 40 in the bottom plate 30 and suitable springs as shown at 41 and 42 may be employed extending between the caps and the plate 27. Thus the pairs of springs 41 and 42 may be employed resiliently to hold the plates 27 and 30 apart with the maximum distance therebetween being set by the shoulder bolts 33 and 34.

It can now be seen that the base plates 27 and 30 are both mounted for movement along the drive shaft 21 and that the plate 30 is also mounted for movement with respect to the plate 27. A suitable mechanism may be employed selectively to move the plate 30 toward the body B to position the desired guide surfaces at the proper pair of slots for winding the concentric coils of the pole group in the stator. Reference again may be had to my copending application, Serial No. 61,557, now Patent No. 3,076,613, entitled "Coil Winding Apparatus" for a disclosure of such mechanism whereby the selected guide surfaces may be positioned at the selected pair of slots.

Referring now more particularly to FIGS. 3 and 4, it will be seen that the locating head 24 may comprise a carefully machined block of aluminum or like lightweight metal and includes two arcuate surfaces 45 and 46 which accommodate the cylindrical outer surfaces of the clamping heads 6 and 7. A central cut-out or recess portion 47 extends between these end surfaces and accommodates therein the radially extending slot forming portions of the body B. Pairs of locating bars 50 and 51 are provided within the well 47 which are adapted to fit within certain slots in the body B properly to locate the slots of the body with respect to the winding head guide surfaces. As seen in FIG. 2, the tops of the locating bars 50 and 51 may be peaked and provided with side guide surfaces 52 and 53 more easily to be inserted within the slots of the stator. The sides of the locating head 24 slope away from the slotted body B at an angle of approximately 45° as shown at 54 and 55 (see FIG. 3) and such sloping sides constitute guide surfaces for properly positioning the wire being fed from the flyer arm into the body in the selected pair of slots. Thus as seen in FIG. 2, the wire W will be positioned in the slots 56 and 57. The ends of the locating head 24 also slope at an angle of approximately 45° as shown at 58 and 59. The bottom of the locating head may be provided with end recesses 60 and 61 (see FIG. 1) which receive bearing holders 62 and 63 which may be fastened into the end walls of the recesses as shown at 64 and 65 respectively. These bearing retainers or holders underlie the bearing 22 on the end of the drive shaft 21 to hold the locating head 24 in its proper position with respect to the shaft 21.

The side walls of the locating head are provided with outwardly offset center portions shown at 67 and 68 which mate with similarly outwardly offset center portions 69 and 70 in the guides 25 and 26. The side guides 28 and 29 are provided with outwardly offset recesses as shown at 71 and 72 respectively which receive the offset center portions 69 and 70 of the guide plates 25 and 26. Thus the locating head, the guide plates 25 and 26, and the side plates 28 and 29 are all nested together in sliding tongue-and-groove engagement by the respective offset side portions. Whereas the locating head 24 is secured directly to the shaft 21 by the bearing retainers, the guide plates 25 and 26 are secured to base plate 27 along the side edges thereof and accordingly the guide plates 25 and 26 are mounted for movement as a unit with the base 27.

Referring now to FIGS. 5, 6, and 7, it will be seen that the guide plate 25 which is identical in form to the guide plate 26 is provided with a base flange 80 having a series of threaded apertures 81 therein. The base flange 80 may be centrally outwardly offset in the same manner as the guide plate and the base flange may then be fitted exactly to the precise edge of the base plate 27 with suitable fastening means such as screws or the like passing through apertures 82 in the base plate and being threaded into the apertures 81 in the guide plate. As seen in FIG. 8, the base plate 27 is provided with the side offset portions 83 and 84. Thus the entire side surface of the base and the guide plates mounted thereon form a tongue to fit within the groove in the center of the side plate 28. The top surface 85 of the guide plate is inclined at the same angle of inclination as the beveled or sloping side surface 54 of the locating head 24. In the proper position this sloping surface thus provides a continuation of the guide surface or wing of the locating head. The top outer edges of the guide plates 25 and 26 may be beveled as shown at 86 and 87 to present a planar continuation of the surfaces 58 and 59 on the ends of the locating head 24.

The side guides 28 and 29 may be fastened directly to the rectangular base plate 30 by suitable fastening means such as socket head screws 90 and 91. The top beveled surfaces 92 and 93 of the side guides are inclined at the same angle as the sloping guide surfaces of the locating head 24 and guide plates 25 and 26, respectively. In this manner, when the parts of the winding head are in the position shown in FIG. 2, the sloping side surfaces constitute a planar continuation of each other so that a smooth relatively wide guide wing surface is provided to assist in the positioning of the wire coils within the slots 56 and 57. As seen in FIG. 1, the top end walls of the side guides 28 and 29 are also inclined as shown at 94 and 95 also to constitute inclined guide surfaces to facilitate positioning of the wires within the proper slots. Each of the inside surfaces of the side guides 92 and 93, of course, is provided with the slot for the tongue-and-groove interfitting arrangement so that the parts are held fixed longitudinally with respect to each other.

Each of the relatively movable components of the wire guiding head, viz.: the locating head 24; the guide plates 25, 26, and the base 27; and the side plates 28, 29 and the base 30; is provided with pairs of stop pins which engage in the clamping heads 6 and 7 properly to locate the guide surfaces of such components in the proper position to facilitate the positioning of the wire in the selected pair of slots. The base 30 is provided with two pairs of bullet nose stop pins 96 and 97 which may be secured to the base 30 but slidable through apertures in the base 27 and the locating head 24. Thus each of the pairs of stop pins 96 and 97 may be threaded or force-fitted or otherwise suitably secured in the base 30 as shown at 98 and 99 while freely slidable through apertures in the base plate 27 as shown at 100 and 101. Also, pairs of apertures 102 and 103 may be provided in the locating head for the pins to move therethrough to contact the clamping head 6, 7.

Similarly, pairs of bullet nose stop pins 105 and 106 may be secured to the base plate 27, either by threaded or force fit connection, and may fit freely slidably through pairs of apertures 108 and 109 in the locating head 24 to contact the clamping heads 6 and 7. The locating head 24 may be provided with pairs of stop or positioning pins as shown at 110 and 111 which contact the cylindrical surfaces of the clamping heads 6 and 7 properly to position the guide surfaces of the locating head with respect to the slotted body B. In the FIG. 1 embodiment, the guide pins 110 and 111 are shown as inwardly inclined better to wedge and compact the wires wound thereabout against the base of the slots in the slotted body and, moreover, the inward inclination of these guide pins will serve properly to space start winding coils, for example, so that the ends thereof will not interfere with the other concentric coils of the same pole group or the coils of the main winding. Preferably, the inwardly inclined guide pins will be employed upon the embodiment of the present invention which is used primarily for the winding of start winding coils.

Referring now to FIGS. 2, 9 and 10, the relative positions of the components of the guiding head of the present invention will more clearly be seen when winding coils into the selected pairs of slots in the workpiece B. The slotted body B will be placed in the clamping heads 6 and 7 and the clamping heads will then be positioned so that the slotted body B will be within the well 47 of the locating head 24 in order that the slots will be in proper position with respect to the wing or guide surfaces of the head. The locating bars 50 and 51 will straddle a ridge between two slots as shown in FIGS. 9 and 10 properly to position the rest of the slots in the body B with relation to the guide surfaces of the movable components of the present winding head. When in proper position, the inclined spacing and guide pins 110 and 111 will contact the exterior surface of the clamping heads. The flyer arm will then be driven to wind the selected number of turns into the pair of slots 56 and 57 as shown in FIG. 2. A counter mechanism responsive to the number of turns wound in such pair of slots may then index the winding head forwardly to the position shown in FIG. 9 wherein the guide plates 25 and 26 will have moved toward the body B along with the side plates 28 and 29. In this position the top guide surfaces 69 and 70 of the guide plates 25 and 26 will present, with the guide surfaces 92 and 93 of the side plates 28 and 29, a planar continuation of each other to assist in facilitating the winding of coils of wire W into the pair of slots 120 and 121. The proper positioning of the surfaces formed by the guide plates and the side plates may be obtained by the stop pins 105 and 106 moving upwardly through the apertures 108 and 109 to contact the cylindrical surfaces of the clamping heads 6 and 7. In response to the number of turns of wire wound into such pair of slots 120 and 121, the indexing mechanism for the head may again be actuated to move the plate 30 outwardly along the shaft 21 and this time, since the pins 105 and 106 will be contacting the clamping heads 6 and 7, the springs 41 and 42 will compress until the pairs of stop pins 96 and 97 contact the clamping heads to position the winding head in the FIG. 10 position. The guide surfaces 92 and 93 have then moved outwardly of the guide plate surfaces 69 and 70 so that the wire W can now be wound within the pair of slots 122 and 123. Thus the pairs of converging guide faces provided by the components of the winding heads can selectively be positioned to guide the wire into the selected pair of slots in the body B.

Since the main and start windings of the concentric coils in a split phase induction motor are positioned generally 90° apart, it can be seen that in the 18 slot body B illustrated, the center of the pole group of the 90° offset windings will be a slot instead of a bar as in the FIG. 10 arrangement. Thus to wind the concentric coils 90° from the coils wound in the FIGS. 2, 9 and 10 embodiment, there is provided a slightly modified head wherein only a single locating bar 130 is employed in the well 131 of locating head 132. The slot in which the locator bar fits would then correspond, for example, to the slot 122 or 123 in the FIG. 10 embodiment. The head of FIGS. 11, 12 and 13 is then also provided with a similar locating head which may vary only in size from the locating head 24 of FIG. 2. The locating head will be provided with pairs of stop pins 133 which in this embodiment may project straight outwardly of the body so that a coil wound around such pins will not interfere with other coils in the group or with the coils previously wound by the head of FIGS. 2, 9 and 10. The straight pin arrangement of FIG. 11 is preferred when winding the main winding concentric coils and since the main winding wire is generally slightly heavier than the start winding wire, a slightly larger loop on the end of the coil of smallest diameter is preferred. The locating head 132 will also be provided with pairs of apertures 134 and 135 for the pairs of stop pins 136 and 137 shown in phantom lines in their extended position in FIG. 11. The guide plates 138 and 139 will be fastened to a base plate 140 and the side plates 141 and 142 will be fastened to the base plate 143. It can now be seen that the head in the position shown in FIG. 13 will wind a coil into the pairs of slots 144 and 56, such slot 56 being one of the slots in which the head of FIG. 2 initially wound a coil. Thus the slot 56 will share a bundle of wires from both the main and auxiliary or start windings. Similarly, the slot 144 will also share such bundle of wires from the opposed pole wound in FIG. 2. In the intermediate position of the winding head, a coil of wires will be wound in slots 145 and 146 and in the "full-in" position, corresponding to FIG. 10, coils of wires will be wound in slots 147 and 148.

In operation, the slotted body B may be placed on the clamping heads 6 and 7 of a machine as that disclosed in my aforementioned copending application, Serial No. 61,557, now Patent No. 3,076,613, entitled "Coil Winding Apparatus." The machine may be equipped with a head as that disclosed in either FIG. 1 or FIG. 11, with the FIG. 1 head being preferred for the start winding coil groups. In any event, the head will be positioned adjacent the slotted body held by the clamping heads as seen in FIG. 1 so that initially, the wire may be wound into the pair of slots 56 and 57. A counter will energize the indexing mechanism to move the winding head to its intermediate position wherein the wire will then be wound into the pair of slots 120 and 121 (FIG. 9). Upon the completion of the proper number of turns, the indexing mechanism will again be actuated so that the wire will be guided by the surfaces 92 and 93 into the pair of slots 122 and 123 (FIG. 10). When this is accomplished, the body B will be retracted and indexed through 180°. Again, in this same manner, three concentric coils will be wound in the corresponding pairs of slots so that two opposed concentric groups of coils will be formed to produce one set of windings, either main or auxiliary, for the stator B.

The body B may then be removed from the machine and placed upon a machine having the head of FIG. 11 thereon and the single locating bar 130 will assist in properly positioning the slots so that the next group of windings will be spaced 90° from the previously wound groups. It will, of course, be understood that the guiding head may be replaced on the same machine so that the body B need not be transferred from one machine to another. In the FIG. 13 position, the wire will then initially be wound into the pair of slots 144 and 56 and when indexed to the intermediate position, the slots 145 and 146 will have a concentric coil placed therein and similarly in the full-in position, the slots 147 and 148 may be filled automatically with the wire. The dimensions of the two wire guiding heads may be slightly different so that the guide surfaces thereof will properly position the wire in the selected pair of slots. It will, of course, be understood that the size of the respective heads and their components will be governed by the size of the body B which is to be wound and also the number of slots therein and, of course, the desired positioning of the coil groups. Moreover, it will be understood that various slots in the body will share the coils from separate coil groups, as for example, the diametrically opposed pair of slots 122 and 123 will have wound therein coils from diametrically opposite coil groups. Also, the slots 56 and 57, for example, will share both the main and start windings.

The locating head, the side plates and the guide plates of the present invention may preferably be made from aluminum, whereas the base plates 27 and 30 may preferably be formed from steel. A face plate 180 may be secured to the bottom of the plate 30 by cap screws or the like to assist in the mounting of the head on the shaft 21.

It can now be seen that there is provided a main and start winding wire guiding head construction which is of simplified design which readily facilitates the winding of a plurality of concentric coils for main and start winding coil groups.

Other modes of applying the principles of the invention may be employed, change being made as regards the details described, provided the features stated in any of the following claims or the equivalent of such be employed.

I, therefore, particularly point out and distinctly claim as my invention:

1. A wire guiding head for coil winding apparatus adapted to guide wire to form concentric coils of wire in an externally slotted body comprising a locating head, means mounting said locating head in a stationary position with respect to such slotted body, stop means mounted on said locating head adapted to position said slotted body with respect thereto, converging guide faces on said locating head adapted to guide a wire or the like wound into a selected pair of slots on such body; a pair of guide plates, means interconnecting said guide plates, and means mounting said guide plates for movement as a unit with respect to said locating head, said guide plates being provided with sloping planar top guide surfaces adapted in one position thereof to constitute a planar continuation of the guide surfaces on said locating head; a pair of side plates, means interconnecting said side plates, said side plates having top converging planar surfaces adapted in one position of said side plates to form a planar continuation of the converging side surfaces of said guide plates and said locating head; and respective stop means mounted for movement with said guide plates and side plates adapted to position such guide and side plates respectively with respect to said slotted body so that said guide and side plates may be indexed into position for winding coils of wire in further selected slots in such body.

2. The guiding head set forth in claim 1 including means nesting said locating head, guide plates and side plates one within the other for sliding movement with respect to each other.

3. The guiding head set forth in claim 2 including spring means interconnecting said guide plates and side plates.

4. The guiding head set forth in claim 3 including shoulder bolts extending between said side plates and guide plates adapted to limit relative movement thereof.

5. A guiding head as set forth in claim 4 including a well in said locating head adapted to receive such slotted body, and locating means in said well adapted to engage the slots of such body to facilitate the correct rotative positioning of such body with respect to said head.

6. In combination, a wire guiding head adapted to guide wire to form coils of wire in an externally slotted body, and a pair of clamping heads adapted to hold such body in position to be wound by said head, said head comprising a plurality of guide surfaces adapted to be selectively positioned adjacent such body for winding coils of wire therein, and stop means mounted for movement with the respective guide surfaces adapted to engage said clamping heads thus to locate said guide surfaces with respect to such slotted body to facilitate the winding of coils therein.

7. The combination set forth in claim 6 wherein said guide surfaces are paired and each pair is mounted for movement as a unit.

8. The combination set forth in claim 7 wherein said guiding head includes a locating head having a pair of sloping guide surfaces thereon, a well in said locating head adapted to receive such slotted body, and locating means in said well adapted to engage the slots of such body to facilitate the correct rotative positioning of such body with respect to said guide surfaces.

9. The combination set forth in claim 8 wherein said respective stop means comprises pins mounted for movement with said guide surfaces to engage said clamping heads when the respective guide surfaces are in posiiton to guide such wire into a selected pair of slots.

10. The combination set forth in claim 9 wherein said guide surfaces include two guide plates on each side of said locating head, and a base plate interconnecting said guide plates.

11. The combination set forth in claim 10 wherein said guide surfaces include two side plates on the outsides of said guide plates, and a base plate interconnecting said side plates, said locating head, guide plates and side plates having guide surfaces thereon which in one position thereof constitute a planar continuation of each other.

12. The combination set forth in claim 10 wherein the stop pins for the respective guide surfaces of the guide plates and side plates are mounted on the respective base plates and freely extend through apertures in said locating head to engage said clamping heads.

13. The combination set forth in claim 12 wherein said locating head is provided with stop pins adapted to engage said clamping heads, said locating head stop pins extending normal to the axis of said slotted body.

14. The combination set forth in claim 12 wherein said locating head is provided with stop pins adapted to engage said clamping heads, said locating head stop pins being inwardly inclined to reduce the diameter of the coil wound thereabout and to pack such coil tightly against said clamping heads.

References Cited in the file of this patent

UNITED STATES PATENTS

| | | |
|---|---|---|
| 1,503,254 | Sippel et al. | July 29, 1924 |
| 1,579,808 | Chapman | Apr. 6, 1926 |
| 1,702,475 | Jahnig | Feb. 19, 1929 |

FOREIGN PATENTS

| | | |
|---|---|---|
| 838,318 | Great Britain | June 22, 1960 |